United States Patent [19]

Metzdorff et al.

[11] Patent Number: 5,087,916
[45] Date of Patent: Feb. 11, 1992

[54] METHOD OF NAVIGATION

[75] Inventors: Walter Metzdorff, Friedrichshafen; Peter Lux, Langenargen; Max Eibert, Friedrichshafen, all of Fed. Rep. of Germany

[73] Assignee: Dornier GmbH, Fed. Rep. of Germany

[21] Appl. No.: 523,130

[22] Filed: May 14, 1990

[30] Foreign Application Priority Data

May 12, 1989 [DE] Fed. Rep. of Germany ....... 3915631

[51] Int. Cl.$^5$ .............................................. G06F 15/50
[52] U.S. Cl. ...................... 342/64; 364/443; 364/449
[58] Field of Search .................... 342/64; 364/443, 449

[56] References Cited

U.S. PATENT DOCUMENTS

3,879,728  4/1975  Wolff ..................................... 342/64
4,490,719  12/1984 Botwin et al. ......................... 342/64
4,910,674  3/1990  Lerche ................................... 342/64
4,914,734  4/1990  Love et al. ............................ 342/64

Primary Examiner—Mark Hellner
Attorney, Agent, or Firm—Ralf H. Siegemund

[57] ABSTRACT

A method for navigation and updating of navigation for aircraft uses range image processing and a reference store, segmentizing the range image data are segmentized in order to obtain a particular pattern of type features for purposes of classifying particular types of objects across which the craft flies; extracting particular signature features including localized elevational jumps and determining the position of the craft by correlating a plurality of features and their spatial orientation to each other as extracted with corresponding stored reference information in order to provide a maximum fit that is indicative of deviation of the flight from a flight path as identified by the reference information.

6 Claims, 7 Drawing Sheets

$B^O$ — MEAN
$B^I$ — GRADIENT$_X$
$B^{II}$ — GRADIENT$_Y$
$B^{III}$ — TEXTURE

METHOD OF NAVIGATION

BACKGROUND OF THE INVENTION

The present invention relates to a navigational methods including updating navigational datas for aircraft and other aerospace vehicles; and more particularly the invention relates to navigation and acquisition of navigational update data for aircraft, the equipment including sensors, image processing and evaluating equipment and a reference store.

Navigational methods of the kind to which the invention pertains concerns an aircraft or a helicopter or any other flying object which scans the territory underneath by means of a sensor acquiring a scanning data that is compared with stored reference data. Moreover it is quite common practice that aircraft have several and, possibly, several different kinds of navigational systems.

The basic navigational system that is used is usually an inertia system which is supposed through satellite and other electromagnetic methods. Also, the pilot augments whatever information he has visually available through manual control. Generally speaking methods are known to compare acquired data which are to some extent characteristic of the territory over which the craft flies, with stored reference information. Known here are methods for image correlation; in particular an imaging sensor which usually is an infrared device and operates in the optical range, looks forward or straight down and takes pictures. These pictures will be stored temporarily as a pattern of many image points. The contrasting pattern of the imaged territory is then compared i.e. statistically correlated with reference patterns and from the sum total of the agreement or disagreement in the correlation one concludes on the position of the craft.

This known method as practiced has disadvantage that the reference pictures have to agree to a very high degree with the real time images just taken. However reflecting deviations resulting from different illumination, from seasonal variations (e.g. shown above) but also images taken on different times of the day interfere significantly with the method as the reference images may "look" different from the actual data acquired during the current overflight.

The known systems could indeed be improved by using infrared radiation rather than visible light and by actively illuminating the area under observation in order to obtain comparable conditions for evaluations, but the basic concept of requiring very accurate reference images and very accurate real time images on the current overflight for obtaining a good correlation is and remains still the same. One can only control to some extent the conditions to which the pictures are taken not to the method of correlation.

In a different class of methods known by terms such as TERCOM, TERPROM, SITAN, SPARTAN, PENETRATE correlation and navigational locating is carried out in the following manner. The territory of overflight is scanned by means of radar in order to obtain an elevational profile. This profile is then compared and correlated with reference strips supposedly having corresponding data of the same area in a strip length of several 100 m. The elevational profile is acquired here by simply measuring the effective altitude above a particular reference level. The strip of the elevational profile is digitally compared with the reference elevational data. This method is to a considerably extent independent from the deficiences outlined earlier but it is apparent that it is quite unsuitable for flight across flat areas and over territory with little elevational "signature". Depending on the kind of territory the acquired data or characteristic elevational changes may simply be insufficient for determining a sufficiently accurate trajectory and flight path.

DESCRIPTION OF THE INVENTION

It is an object of the present invention to provide a new and improved navigational system permitting determination of position and location of an aerospace vehicles and craft in an accurate manner that is very certain in its result and autonomous and to a considerable extent independent from the time of day, from seasons, and from the weather.

In accordance with the preferred embodiment of the present invention it is suggested to provide a sensor which preferably in a line-by-line pattern provides range images; that the image data are segmentized and subject to particular feature extraction for purposes of classification by means of appropriate objects; and that the position determination results from comparing the relative disposition of objects as identified by specific features with the areal distribution of corresponding reference information. Thus in accordance with the present invention range images are automatically acquired and suitable types or kinds of objects are selected within such a image in that they are searched for, recognized, identified and compared as to the territorial disposition with appropriate reference information. This kind of method may be supplemented with regular images from the object i.e. in which the contrast is not indicative of a range but constitutes the usual regular bright, dark distribution pattern and reflectivity and so forth.

In furtherance of the invention a unit is provided for segmentation and feature extraction that particularly in the case of low elevations is capable of correcting geometric errors through a fanlike correction and positional error corrections. The feature recognition as per the invention requires that certain types of objects are identified as to range modulation they provide as far as any range image of them is concerned. This includes e.g. recognition of forest vs bushes vs flat grass land or the like; streets within a otherwise regular territory; bridges, rivers, houses, housing patterns and so forth.

The search for this type of objects is automatically controlled in such a manner that in a particular, type-searching mode on the basis of the available reference information certain types are expected to occur. In other words the search for any specific types in the real time data currently acquired can be in anticipatory fashion preprocessed towards looking for types to be expected.

In furtherance of the invention a hierarchical method for object segmentation e.g. so called S-transformation may be carried out and here reference is made to the Archive for Electronic and Transmission engineering, Vol. 31, 1977, pages 267-274. Still in furtherance of the invention a particular sensor that can be used without having movable parts, is incorporated here in that specific reference is made to concurrent patent application, atty docket DOR/M315-s.

Broadly speaking, the term profile segmentizing, i.e. segmentization of acquired (laser radar) means for elevational data are structurally analyzed in terms of (a)

regular vs random deviations from an average profile level (b) amount of such deviations from one elevational data point to the next one (c) regularity of gradients in elevations and in which directions (d) absence of any deviations. Establishing blocks, strips or areas of uniform segments in this fashion establishes typing criteria such as "forests", "flat land", "houses", "lakes". This way one establishes areas identified by types or classes of objects.

The term "feature extraction" is used here for classifying purposes and is essentially related to the determination of the boundaries of segments and signatures (size of the forest, of the lake, of house/villages) which boundaries may be individually acquired from the spacing of transitions of different type segments in forest/field or lake/houses.

In summary the inventive method and equipment offers the following advantages, there is suggestions of autonomous and very accurate navigation as well as navigation support which is usable during day and night and independent from any ambient illumination, because not regular images but range images are the backbone of the method, and it was found that owing to single construction of the equipment it is quite free from interference defects and rather sturdy.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 5a, 5b, 5c are schematic perspective drawings of different kinds of sensors as they operate during overflight processes and operations. Herein FIG. 5c shows a sensor of the type in copending application Dor/M315-s being incorporated by reference herein;

Figure 1:
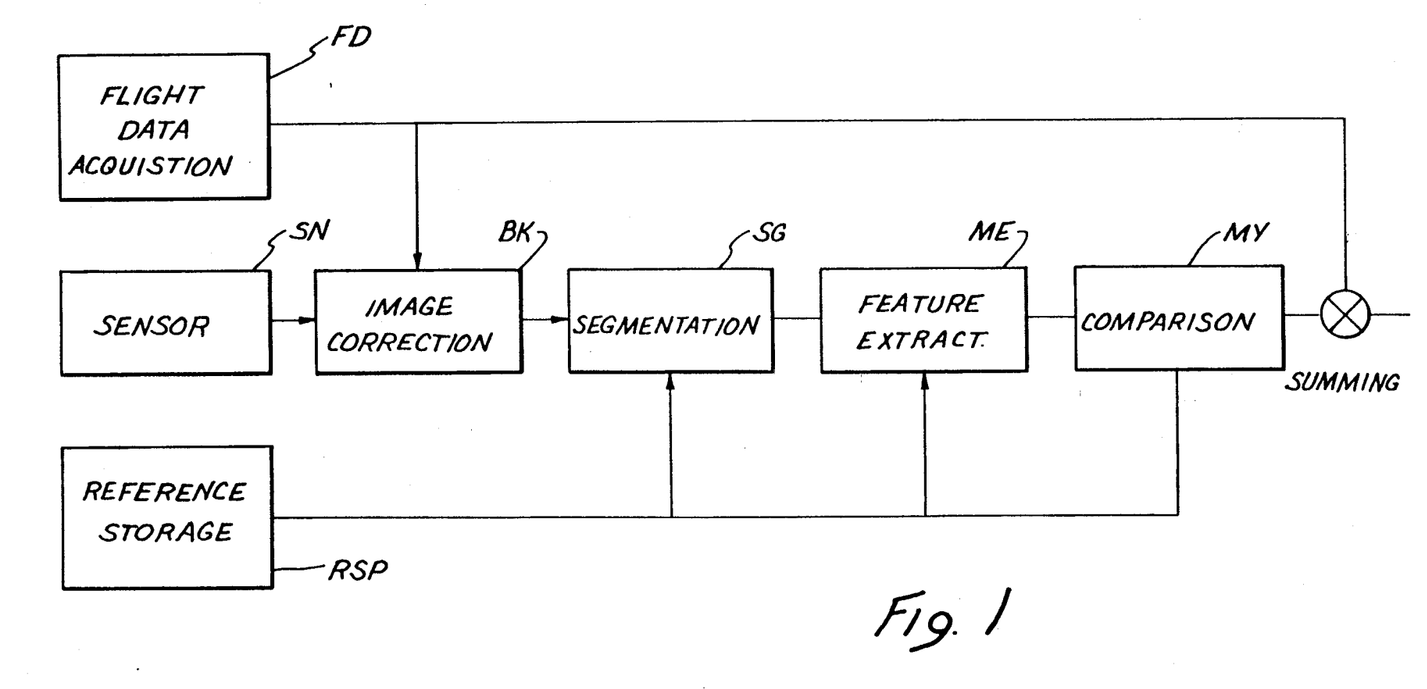
FIG. 1 is a block diagram of an inventive method in accordance with the preferred embodiment of the present invention for practicing the best mode thereof.

Proceeding now to the detailed description of the drawings, FIG. 1 illustrates a block diagram of equipment by means of which the inventive method is carried out. In accordance with the invention a sensor Su is provided details of which will be discussed later. The sensor feeds the output data to an image correction stage BK which compensates for variable speeds, variations in elevation and so forth in a kind of normatizing fashion and using flight data generally from the aircraft's equipment FD which includes altimeter, speed measuring devices and so forth. It is the normalized output data that is segmentized in a manner to be described more fully below, and following the segmentation certain features are extracted in a unit ME, again this will be explained in detail below and the particular features so extracted and identified will be compared with reference data stored in a suitable store RSP in a correlating and comparing unit MV. The content of storage device RSP already is used in the segmentation and feature extraction process for reason of anticipation of what kind of features may be expected on the current overflight.

The entire arrangement operates in summary as follows. The sensor images in a range finding manner and by means of a line scan of the territory across which the craft flies. The image correcting device BK basically produces a line for line image which is free from distortion and is in fact a range image of the territory as stated but in a normalized fashion. The stages downstream from the unit BK provide processing of the image data for purposes of extracting and selecting characteristic features of objects in a classifying fashion deemed sufficiently and accurately identifiable so that the distribution pattern in the territory of overflight makes them suitable for type indentification for purposes of navigation. This includes the distribution of buildings and houses, of different kinds of forests, trees, bushes groups of trees, individual trees, but also dams, bridges, railways etc.

The segmentation unit SG is provided in preparation of this image extraction. Certain attributes of classes of objects disposition define distinctive characterizations such as length of the delineating vectors, height; volume; regularity and variability of geometric features; instances of moment inertia axes; shape and form parameters; position of any geometric center of an area; position of the center of gravity; certain boundaries and other features are identified in the so called feature extraction unit ME. The unit MV is the comparison which e.g. correlates a specific sequence of such general, classification features as previously extracted, with reference patterns of such features or kinds of features expected to be encountered by the flight on overflight. The position of the objects as directed relative to each other and as correlated to same-kind of object's position in the reference data is then indicative of any needed update for purposes of navigational correction.

The determination and calculation (evluation) and relation of features is made prior to the flight either manually or interactively, automatically. These activities are carried out in so called reference centers. This is a process by means of which the reference data is suitably prepared. These reference data are e.g. extracted from available maps, areal photos, satellite photos and otherwise digitized topographic information such as from so called digital land mass system, comsat or the like and here, then quite possibly subjectively, the flight territory of overflight is selected on one hand and identifiable objects therein are searched for classified and identified in a weighing pattern.

Features of interest are properties of objects which in fact can be acquired in terms of range data by means of a radar sensor so as to serve as reference material, provided they are sufficiently strongly identifiable and particularly available in a kind of repetitive pattern. The features of intent are of course basically characterized by "jumps" in elevation and range. Such jumps are provided and given e.g. by the border of forests, the vertical walls houses or multiple groups of houses etc. All this will be explained by way of example below.

Figure 2:
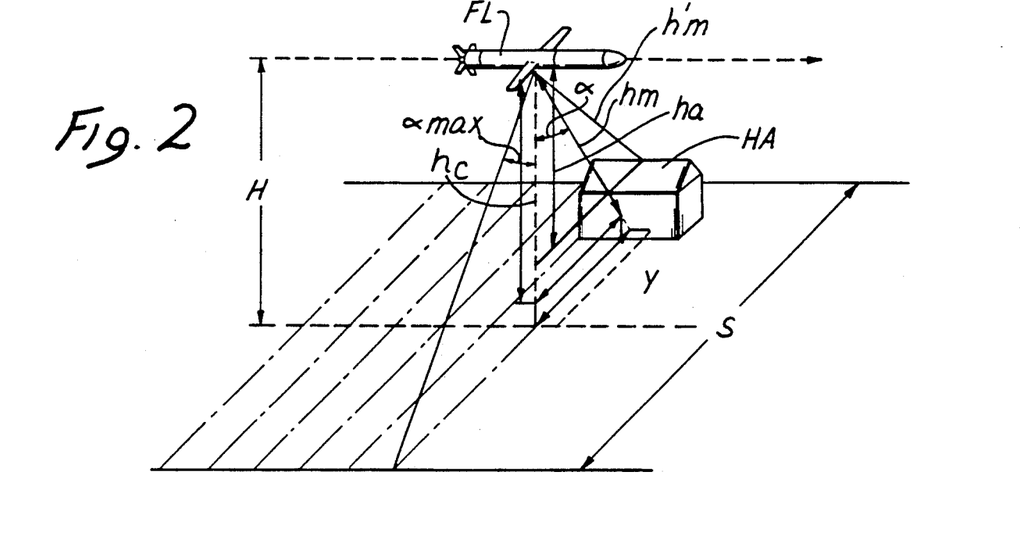
FIG. 2 illustrates the scanning pattern in a perspective view during overflight over a particular territory.

The sensors are systems for taking range pictures or combination of range images and degree of reflection images. FIG. 2 now illustrates an aircraft or any other flying object FL assumed to operate and navigate in accordance with the navigational method of the invention. The craft is provided with a sensor which scans the territory of overflight by means of range finding along a hypothetical strip of width S. The territory i.e. the strip having width S is line scanned transversely to the direction of flight, covering a particular angular range 2x alpha max. For this purpose the craft transmits laser light e.g. and range processes the echo and return signal. Transit time and angle alpha relative to the vertical together determine an elevational profile of the strip as it is covered by overflight.

FIG. 2 shows specifically the height H of the craft above ground generally, the angle alpha and the width S of the ground strip. The value hm is the more specific distance of the craft from an object. In this case a house is assumed to be in the strip S at a spacing y from the center line of the trajectory and path of the craft. The detected "height" hc is of course the value hm/cos alpha which is not a true height, but in this case is a length value being indicative as such of a vertical wall because there is a change in hm with a change in scan angle alpha. ha is the height of the craft above the house Ha.

Figure 3:
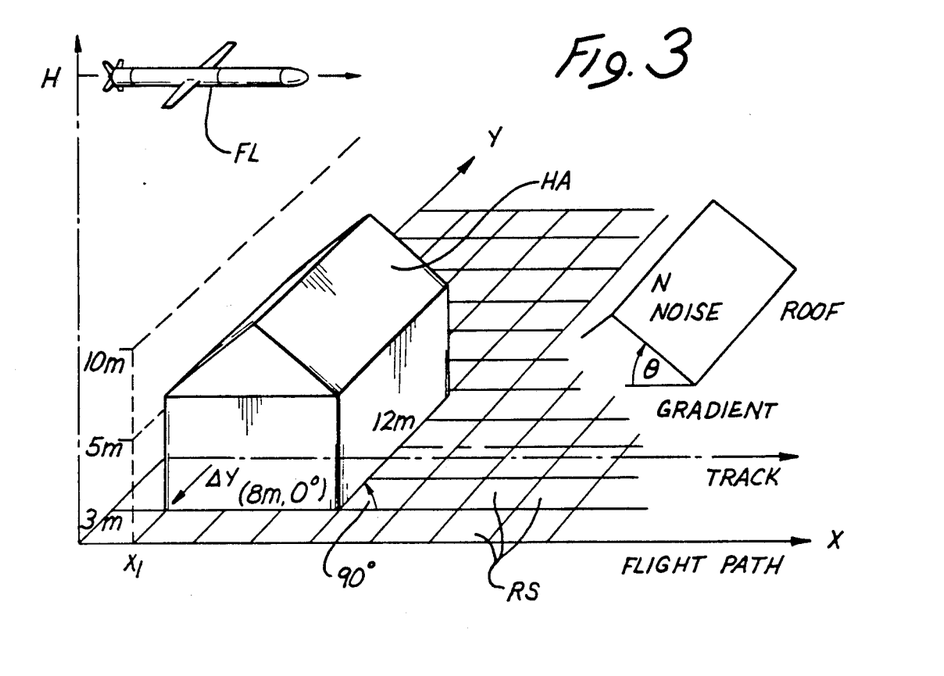
FIGS. 3 and 4 are perspective and schematic drawings, similar to FIG. 2, but showing different kinds of overflight territory and houses in FIG. 3, forests in FIG. 4.

FIG. 3 illustrates in greater detail this house, Ha and features and characteristics of the house. The position and dimensions are boundary defining vectors as far as elevation is concerned and are part of the storage trajectory of the craft Fl. It is this kind of information that will be extracted as depth/height information from the data acquired on overflight. These features can be calculated from the range pictures under the given range and distance resolution and using a territorial resolution identified e.g. by raster squares RS in the drawing. These raster squares are a hypothetical pattern of resolution which the scanning process superimposes upon the territory of overflight.

Figure 4:
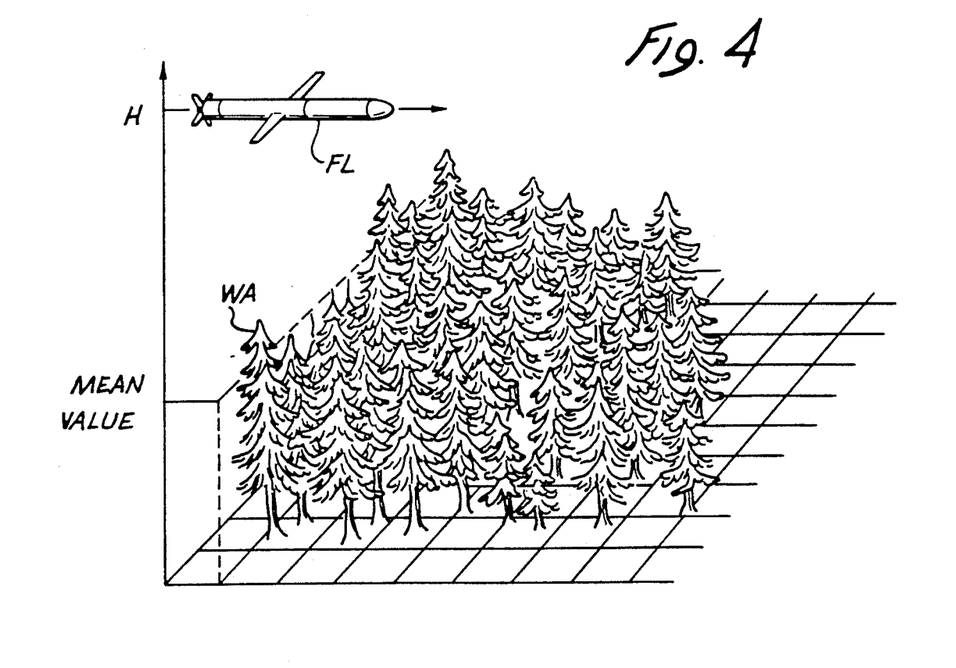

The house shown in FIG. 3 offers a fairly regular pattern which is an aspect of its significant and of houses generally. The situation is somewhat different for forests shown in FIG. 4. The forest is shown to occupy a particular corner area in the territory and is identified e.g. by a certain average height of the trees above ground with an irregular modulation superimposed. As the craft flies across the boundary of the forest it recognized as an elevational jump. Certain other features e.g. distinguishing pine tree from trees with leaves (or without in winter) the like are all features which have attributes that influence the characteristics of range variations detected on overflight as object typing features are significant.

Figures 5A, 5B, 5C:
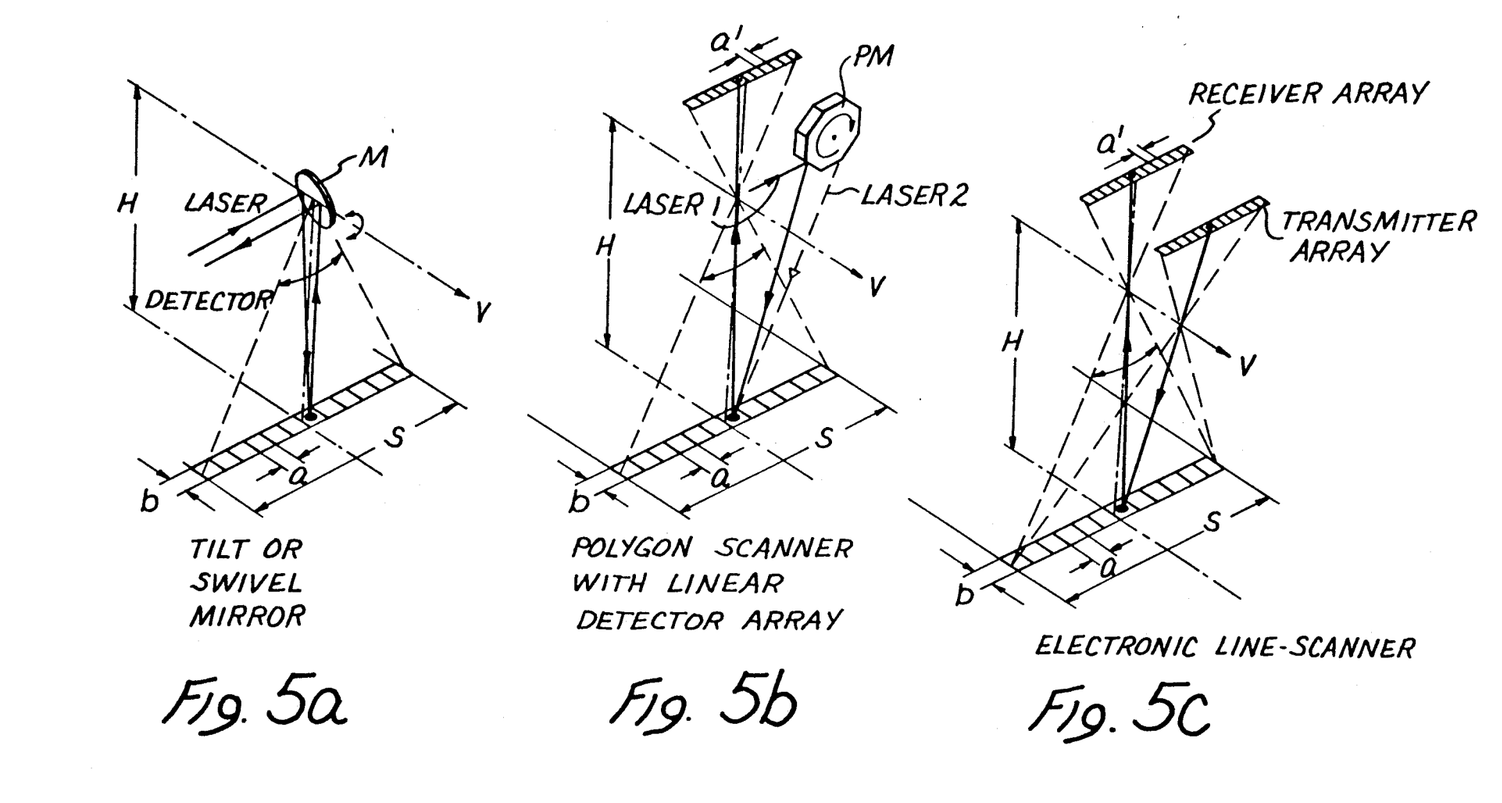

Proceeding now to the description of FIGS. 5a,b,c three different scanning principles are shown for acquiring the requisite range images. FIG. 5a shows a so called laser radar which is colinearly disposed in relation to the detector and i.e. they are positioned next to each other to the left of the figure and cooperate with a pivot or tilting mirror M whose swivel range covers the width S of the strip in terms of a particular line of a width b which is taken in direction of flight identified by the velocity vector v. The elevation is identified on the average as being given by the dimension H as overflight height. The letter a refers to a dimension in the width direction of overall strip width S and identifies a raster dimension, such that a and b together define individual raster "points" RS (or, better elemental or subelemental areas) as per FIG. 3. a and b could be equal, but that is not essential in principle. These dimensions are given by the dimensions of the laser beam.

FIG. 5b illustrates a modification for a laser radar device. In this case it is assumed that two lasers, identified by laser 1 and 2, are used for scanning across the strip S as before and the reference characters a and b are raster cells in that scanning pattern. The deflection mode however is slightly different from FIG. 5a. There is a polygonal mirror wheel PM provided which rotates in one direction as indicated by the curved arrow. This scanning provides not a back and forth scanning but is always scanning from one side to another when a jump occurs and other transverse strip is scanned in the same direction as those before. The receiver and detector in this case is constructed as a line array of diodes arranged behind a lens. The raster fields a and b are actually represented by individual diode areas within the diode line array and a', b' refer to the dimensions of the individual diode elements within the array. The reason one uses two differently oriented lasers is to increase the scanning rate as well as the power output for moderately fast mirror wheel or rotation.

FIG. 5c illustrates a third laser radar version which does not use any mechanically moving parts. In this case the sensor is arranged and provided through two lines of diodes, a receiver diode away and a transmitter diode array. These two diode arrays are arranged parallel to each other, the parallel direction is of course equivalent to the direction of scanning and the arrangement, as far as staggering the two arrays is concerned, is in the direction of flight. Suitable optics are provided to establish imaging relationship between the strip on the ground on one hand and the receiver or transmitter on board of the aircraft. Each raster point in the transmitter array corresponds to a raster point or field of the dimensions a.b on the ground.

In addition each such point or area is associated with a diode in the receiver array and with a diode in transmitter array. The scanning in this case is continuous through sequencing of enabling one transmitter diode after the other and correspondingly read the output of one of the receiver diodes for each instance to thereby simulate a scanning pattern. The scan is constituted here as an electronically operated correlation as between the selection of a transmitter diode, in a sequential pattern from the transmitter diode array, enabling the same and correlating temporarily that enabling with a sequential pattern of receiver diode enabling, such that each diode pair of a thus enabled diode pair will thereby be correlated to the respective other ones through one and the same raster point ground both of them "look" at.

It can readily be seen that the mechanical versions of scanning as shown in FIGS. 5a and 5b have the drawback of a limited use life and also a limited storability in the sense that the mechanics and the movable part deteriorate after certain amount of inaction in terms of time. Also for high speed aircraft the mechanical motion is troublesome. The particular polygon scan shown in FIG. 5b is still better in terms of high aircraft speed as the tilt or vibrating mirror arrangement of FIG. 5a. But in either case the mechanical construction limits the use life and inventory. The electronic line scanner as per FIG. 5c however avoids these disadvantages and scanning is done strictly electronically while the resolution is enhanced owing the the parallel arrangement of transmitter and receiver diode arrays. Details of this kind of scanner are shown in the copending application of common assignee (atty docket DOR/M315-s), the content of which is incorporated by reference in this application.

Figure 6:
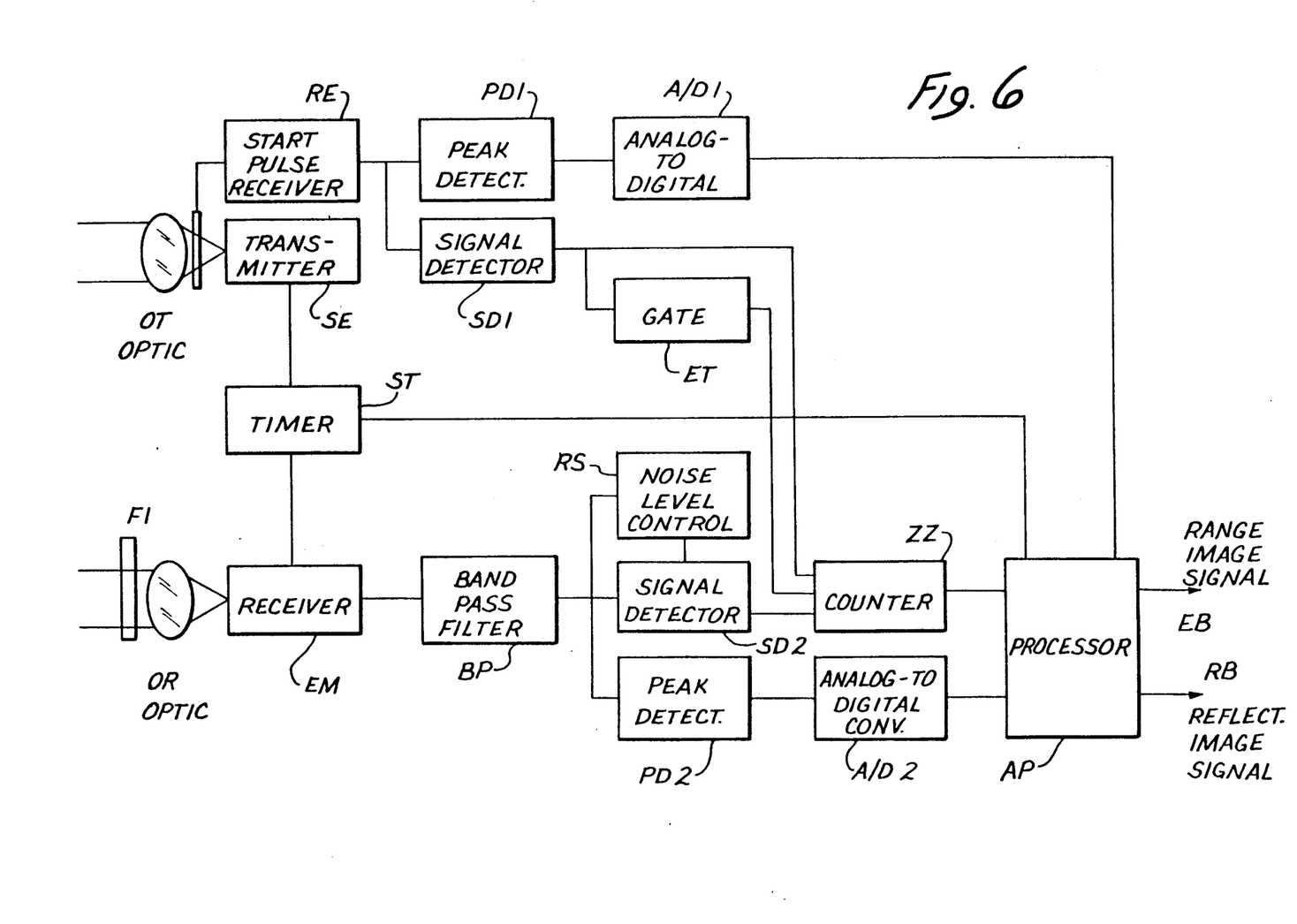
FIG. 6 is a block diagram of the sensor usable in the present invention and being of the kind referred to in the copending application Dor/M315-s incorporated by reference herein.

FIG. 6 illustrates a block diagram that is associated with the sensor shown in FIG. 5c. In other words FIG. 6 illustrates the operating block diagram for the electronic line scanner. However, the particular arrangements as far as processing receiver data are concerned are the same for the other type of sensor as in FIGS. 5a,b. In each case it is necessary to extract transit times and transit time differences as far as the ranging of the echos are concerned. One can use also reflection images in conjunction with range pictures resulting from the scattered reflected components of the light pulses as they being effected and modulated by the scenes, objects etc.

For purposes of scanning the sensor in order to obtain range images as well as reflection images respectively output channels EB and RB are provided by the block diagram in FIG. 6 and the scanning is carried out sequentially with electronically operated light pulse transmitter unit SE and the light pulse receiving unit EM. All these elements and components are controlled by the system timer ST. The particular embodiment shown in FIG. 6 presupposes a 64 transmitter diode elements and 64 receiver diode elements, in the respective diode arrays and it is also supposed that a coaxial or biaxial optical system provides so to speak images of the transmitter and receiver units upon the scene subject to the range finding. Some of the light that is issued by the transmitter unit SE is branched off and fed to a receiver for generating a reference signal RE which provides an electrical signal for determining the starting pulse by means of a signal detector SD1 which states transit time counter 22. Also triggered is a first peak value detector PD1 which measures the actual output of light transmission by the respective diode and an analog-to-digital converter AD1 converts that light level signal into a digital signal.

The starting pulse initiates the transit time measurement through triggering the time interval counter ZZ and also a window or gate ET is enabled after a certain period of time in order to suppress undue echos which cannot possibly result from a reflection of ground. This may occur e.g. of dense fog. The 64 receiver diode elements in the receiver EM are multiplexed (not shown) for feeding a common feeding channel that is a signal processing and evaluating channel that is used in common by all receiver elements in the array. Alternatively one can use a single receiver and an optical multiplexer that is constructed for example as an integrated optics which is another possibility.

In order to minimize noise the pulses as received from a target are run through a first optical filter F1 and the electrical output of the multiplexed diode is filtered in a bandpass filter BP. Since the receiver echo may vary strongly simply on account of different target distances and of course on account of differences in reflectivity of the objects which reflect, one uses in the second signal detector SD2 a stop pulse in accordance with the constraint fraction trigger principle. The output of SD2 stops the counter and the count state is used by AP as image point in a range image.

A noise level control RS and the gating window gate ET makes sure that erroneous detections occur in a negligible number. The transit time measurement, that is, measuring the time interval between the issuance of a light pulse as detected by SD1, and the return, is carried out through a digital counter ZZ. That counter is stopped by a true echo signal from a temporally correlation diode described above.

The signal amplitude which is proportional to the receiving power of the respective receiver elements is ascertained through a second peak value detector PD2 whose output in turn is fed to a second analog-to-digital converter A/D2 which in turn feeds the digital output that is indicative of a signal amplitude to the evaluating processor AP. The processor looks at the power and range data and establishes suitable normalization operation for purposes of defining reflectivity in a normalized fashion and these reflectivity data are then used in order to establish a reflection image that is being processed and used parallel to the range image EV. The processor generates the regular degree-of-reflection image by generating image points in which each is detected output of PD2 and A/D2 is compared with the preceding output of PD1 and A/D1 and the difference is of course a brightness image point.

Further features of the principle are the following. The single pulse measurement, without averaging; an optical time interval counter starting pulse; electrical filtering noise level control; gating in order to suppress unlikely echos; electronic scanning; a direct time interval measurement through pulse counting; measuring the transmitter power is used on an individual pulse basis corresponding thereto receiver power is measures; real time reflectivity image production.

Utilizing the method of single pulse measurement in combination with direct time interval measurement permits particularly to recognize pronounced jumps in elevation which of course are as far as sequential scanning is concerned, directly reflected in a noticeable difference time counts, corresponding in a jump in ascertained range. That of course is a very fast and effective method for ascertaining of features having and producing elevational jumps which are used as signature features for recognizing type-object characteristics of and in the territory of which the craft flies. The individual receiver and transmitter fields of views are matched to each other and the utilization of optical as well as electrical filtering on one hand as well as noise level control with detection threshold matching on the other hand, one obtains in effect a great deal of independence from ambient lights, differences in daylight and ambient illumination, as well as seasonal effects. The result is a stable set of range data with minimal failure rates.

Owing to the adjustability of the gating window of the distance gate ET one obtains a temporal limiting of the measuring ranges and of the distance ranges to eliminate faulty pulses that are too easy. This reduces erroneous jumps as well as undue stray signals and spurious signals resulting from unlikely echos such as fog.

After having explained certain principles involved with reference to FIGS. 3-6 we return to FIGS. 1,2 and take also a closer look at FIGS. 7-10 in order to gain a better understanding in the inventive method. Generally speaking there is the sensor of whatever design SN but preferably of the kind explained with reference to FIGS. 5c and 6. The sensor provides image data and as was mentioned above these image data are corrected in a stage BK as shown in FIG. 1 which in detail requires the following. First of all there is a correction in position and placement of areas which occur in the case of larger deviations from a straight down direction. In other words a pronounced forward scan requires corrective distortion owing to the oblique way of looking at the target. It is understandable that the method of the invention is the more effective the earlier one is able to acquire information about possible deviations of the flight path from the desired one. On the other hand this requires a looking in forward direction so that the data acquired as range data are not strictly altitude data.

Moreover certain vertical surfaces house walls or the like intercepting the transmitter light beam produce genuine echos which however are not directly indicative of jumps in elevation. Here corrections are needed as was already alluded to above with reference to FIG. 2; of course these types of corrections are not needed in case the looking angle is straight down, which however is a special case. The main factor to be considered is the particular disposition of the craft. Here then the fanlike scanning and the way it affects the areal geometry in the range imaging will again be explained in reference to FIG. 2. For purposes of exact comparison with reference information the equiangular scanning geometry must be recalculated into equidistant ones. The measuring angle such as alpha and the elevational data hc are the desired information and in fact the only desired information but it is the hm pattern which so to speak has to be acquired and which is hopefully reflected in the reference data for correlative comparison. The measured values alpha and hm are interrelated by the simple trigonometric function y=hm.sine alpha and hc=hmcosalpha which in fact now relates the elevational height value hc with the horizontal distance y of the craft from the object.

In order to subdivide the ground y value into an image and raster point, one can select any kind of raster constant r but once r is determined the various values of hc are associated with the raster value yr by forward counting from 0 to +20. That raster value is specially the closest one (horizontally) to the craft as per the calculation above.

Two errors which can be produced by buildings will be explained with reference to FIG. 2. Firstly, if the laser beam from the respective transmitter diode hits a vertical wall, an incorrect elevational value is simulated. Also the far boundary of the building (as seen by the craft) is shaded; that means the other vertical jump is so to speak shaded by the building itself. The corrections needed here can be carried out as follows. The one laser beam shown in FIG. 2 will indeed be intercepted by a vertical wall which is in effect noticeable in that a sequence of raster points have regularly projecting different distance values. Since in each case whenever there is an edge the peak value detection always is attempting to establish the highest point that means, the maximal elevational difference from previous situations. The smallest range value resulting from this interception is stored as a particular raster point yr. This range is now expected to vary from line to line and is dependent upon the actual elevational of the outermost measuring point in terms of larger angle, alpha. Beyond this point, owing to missing data one cannot provide any interpolation and one will in fact consider the edge as a point of maximum distance or greatest height so that later upon segmentizing to be explained this particular vector will not be interpreted as a vertical building boundary. If one or several raster points are skipped owing to the shading, and on continuing of the scan, then the first distance value ha which is associated with the just calculated raster point yr is retroactively associated with those yr values in raster points which have not received or better are not associated with genuine range data. This way one covers shaded areas in effect through interpolation. By way of example, the scan from hm in FIG. 2 to h'm yields a number of height values which are progressively shorter with ha being the shortest and is followed by a jump when the angle alpha is such that the beam of a diode clears the roof top of house HA. Thus, there is an indicator of shading and in conjunction with the values from y one obtains a signature of a house that is off the flight path, here to the left.

The step mentioned above needed for the correction of errors on account of a position of the aircraft deviating from the straight down and normal position is compensated broadly through roll, pitch and yaw measurement. These are of course flight data value available at any time separately ascertained for the craft as part of the flight data and these respective angles are then used through known trig relations for correction of flight data.

Figure 7:
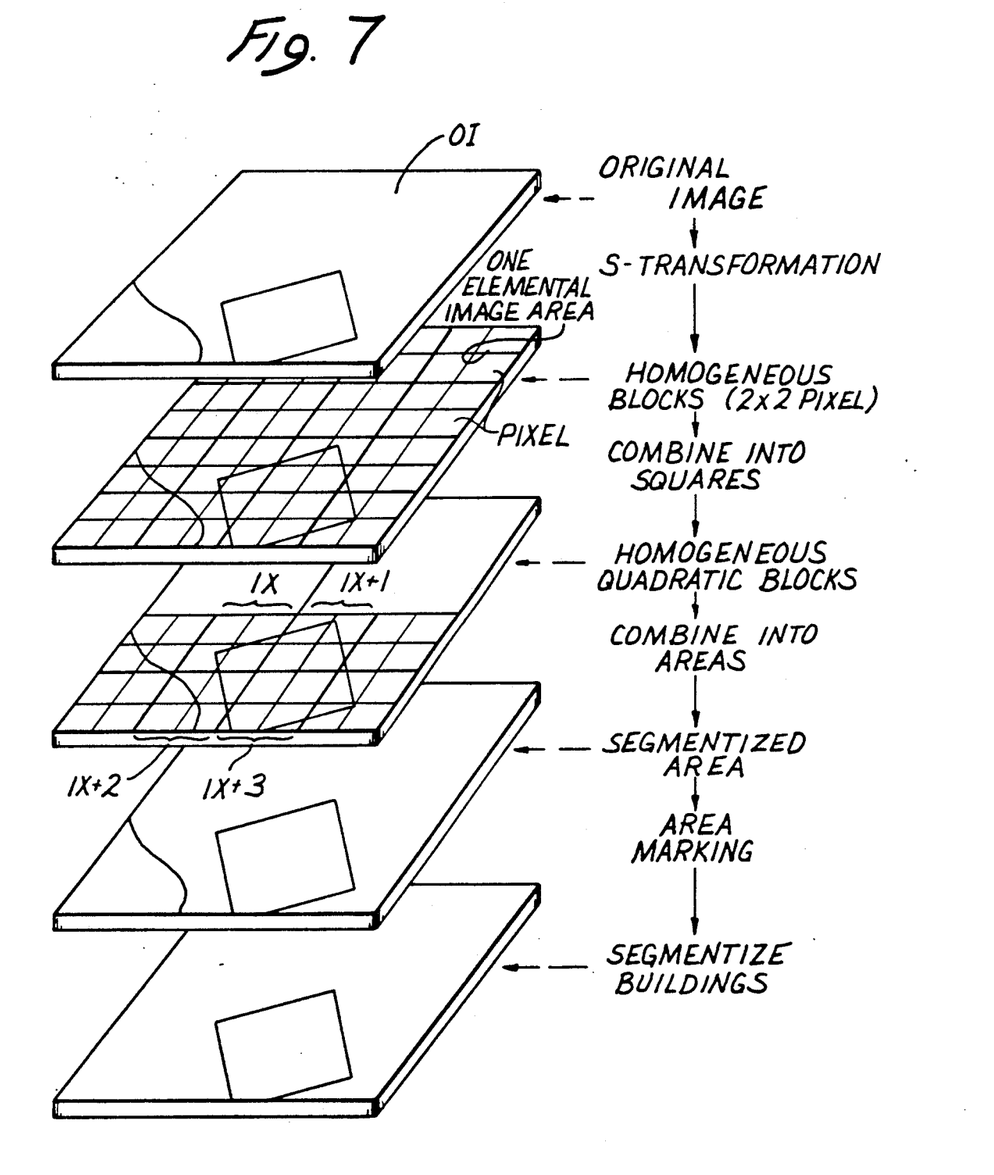
FIG. 7 is a sequence diagram for explaining the segmentation of data.

FIG. 7 illustrates the steps for segmentizing the objects particularly for demonstrating the function carried out by the component or unit SG in FIG. 1. Segmenting here is to be understood to encompass a breakdown of data into essential, signature defining features! Owing to the need for high processing speed this segmentation is carried out in a hierarchial fashion. One begins with the notion that an image of size $2^n \times 2^n$ is to be processed wherein 2 is an arbitrary elemental scale value. This is no limit on general considerations since any image can either be divided into squares of this nature or through supplemental filling in it can be increased to that particular size. An image O1 of that size is transformed in a first stage of a so called S-transformation to the structure of $2 \times 2$ coefficients.

Figure 8:
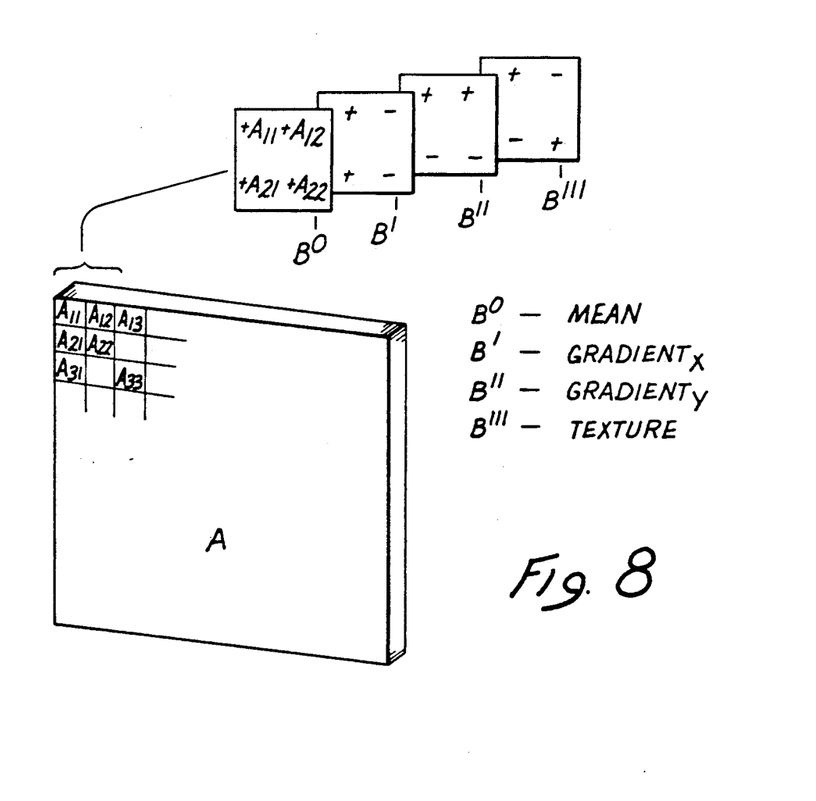
FIG. 8 is a schematic representation of the so called S-transformation provided in the segmenting process explained with reference to FIG. 7.

Before proceeding with FIG. 7, the S-transformation is explained fully with reference to FIG. 8. In other words, an elemental image area is subdivided into form subelements or pixels A11, A12, A21, A22. They are used to define coefficient that are associated with the four-subelemental, elemental image area. These values e.g. are the following: B0 in a range image will be the average distance of the entire elemental image area from the craft. B1 is the overall areal gradient in the x-direction; B2 is the areal gradient in the y-direction; and B3 is a measurement and indicator for texture, i.e. it is e.g. the average absolute difference among the four pixels.

From this information one can already extract information about the type of the object that is responsible for the image values A11, A12 etc. For example a house is usually identifiable by a rather homogenic roof having a particular gradient while no pronounced gradient is present in the case of the forest but there is a pronounced texture. In the case of a house roof B1 and B2 have a definite value that should depend on the inclination of the roof while B3 as an indicator of texture has a relatively low value. The texture is definable as some kind of mean statistical average of deviation. In the case of a forest the situation is quite the opposite. The texture indicator B3 is very high and B1 and B2 will probably be close to zero. Now if each 2×2 raster point is classified in that manner these points can now be combined into larger units. This e.g. can be produced directly where larger areas have comparable texture. Blocks with 4×4 or 16×16 etc. image elements can be composed in this fashion.

This combining process is done by a computer and is carried out at least one image element is going to be added that has a highly deviating texture. Homogenous image elements as being transformed and adjacent are combined in the same fashion but with a difference that on combining the blocks they are further subjected to further S-transformation. The further stages of S-transformation consider the respective B0 coefficient and with the four values of adjacent blocks more transformation coefficient obtain on the basis of the scheme that is also derivable from FIG. 8. In other words there will be an average, gradients in different directions and there will be texture indication. In other words, a first elemental image was composed of four pixels or subelemental areas, A11, A12, A21 and A22. These yielded four coefficients. Now there is an adjacent group or elemental image area composed of four pixels named A13, A14, A23, A24. These yield also four coefficients. These include an average B and now one can use the averages of four elemental image areas and compose therefrom area overall average, a gradient in the x-direction in the y-direction and a texture coefficient and so forth.

Various signatures are shown in FIG. 7 involving gradually increasing the coarseness as far as resolution is concerned through containing of more and more image areas. This method prevents that edges between other homogenous areas remain undiscovered as that will result in incorrect homogenous areal construction. If on further transformation texture and gradient remain low or constant which is indicative of large areas of more or less uniform inclination and texture then the blocks are combined to larger blocks of the kind $2^n \times 2+n$. This of course is by way of example only. A combining of other geometries of course is also possible but the particular one described here is indeed preferred as a very fast and very effective method as far as evaluating the measuring data is concerned. The result of this blockwise processing in steps of increasingly coarse structure of the area yields type classification within range images in this fashion to be explained more fully next.

FIG. 7 illustrates this scheme of segmentization. In the original image the first stage of S-transformation is carried out. Homogenous blocks begin with 2×2 pixels per elemental image area. These are then combined into larger blocks. the further stages of the S_transformation is carried out until no similar areal contours can be combined anymore that are the white areas in the 3rd plane or level as per FIG. 7. In order to obtain more accurately the objects it is desirable to have a still better determination of the areal or domain boundaries. This can be carried out in that the boundaries of such segmentized areas are checked with regard to the point that blocks of similar properties have and are combined on the basis of the transformation coefficient. This combining through adding is carried out when one finds e.g. a boundary line e.g. an elevational jump that is of course delineation of a building or by a field surrounded by bushes and trees and so forth or some kind of change in texture is found where the forest transitions in a field. Specifically, the four elemental image areas identified by lx, lx+1, lx+2 and lx+3 in the third level of FIG. 7 yield different inhomogeneities in their respective coefficients and can thus not be combined, but these inhomogenietes in the coefficients are the signature elements by means of which e.g. building is recognized. By means of this program structurization it is made possible that the calculation increases only with the size of the area covered contrary to a merely sequential combining image of points which will increase the calculating with the size of the image, and that is a significant saving.

FIG. 8 illustrates in principle how to proceed with an S_transformation during a segmentation of the kind described. The particular field of view A assumed to cover a range image is subdivided into pixels. By way of example and as already stated pixels A11, A12, A21 and A22 are shown in detail and in the first stage of the S-transformation ascertains the value B0 which is the average or mean; B1 is the gradient in x-direction, B2 in the y-direction and B3 is the texture. In other words these four pixels are transformed into these four coefficients. This then is in effect the base consideration for a 2×2 block transformation of four pixels. The transformation is of course a simple arithmetic procedure through summing and subtracting of the range defining value of the respective image element pixels.

The average obtains by summing all four values, the gradient in x-direction sums the two left pixels and the two right pixels specifically and the sum of the two left pixels is subtracted by the sum of the right pixels. The y-gradient is analogously obtained in the orthogonal direction and the texture can be the difference between the pixel values from each other. This is a very simple arithmetical procedure and one can see that further features such as elevational different vis-a-vis the average environmental level the length of a periphery, the ratio of periphery to area encompassed inertia axes, moments, position of boundary vectors and so forth can all be calculated out of the pixel data in order to resolve characteristic features for object classification and feature extraction. This extraction is carried out in the part ME of FIG. 1 and will now be explained with reference to FIGS. 9,10 ultimately for purposes of preparing this data so obtained for the correlation in component or unit MV (FIG. 1) which is of course the ultimate purpose of all this processing.

The process of feature recognition and position determination can be carried out in two independent ways. These methods may be carried out independently from each other and provide separately for a comparison with reference information. The result of the comparison on one hand will then be used for navigational updating while on the other hand the parallel operation is simply used to increase the safety factor that is inherent in this redundant approach. The first method for feature recognition and position determination is in the following referral to point distance correlation, or pdc, and is to be explained with reference to FIG. 9.

Figure 9:
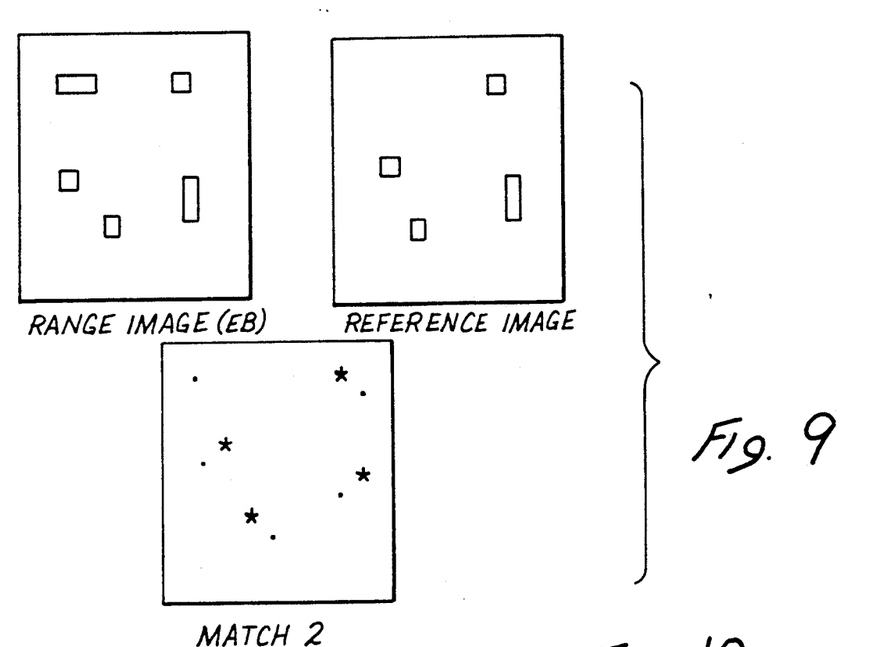
FIGS. 9 and 10 are exemplary diagrams for purposes of explaining the feature extraction and comparison method practiced within the method of navigation that is the subject of the application.

This method basically characterizes objects within an object class and identifies them in certain area by a dot. The dot may for example be an areal center of gravity, a particular defined edge point or some other unambiguously defined points that can be associated with a particular object. FIG. 9 shows in the upper left hand portion e.g. segmentized image data of a real range image EB e.g. group of houses while in the right hand portion a corresponding reference REF is shown. In the lower part of FIG. 9 the PDC operation is illustrated. The objects of the real range finder image or more precisely the centers of these buildings are identified by little black squares. The centers of reference image buildings are identified by asterices.

The position of the points of an object class, such as buildings, will be extracted from the segmentized area covering a portion of the territory over which the craft has flown and the extracted information is stored in a particular portion of the memory that is the loci of the black squares. A single kind of information is taken and calculated from corresponding reference in formation that has been prepared in an arbitrary fashion (e.g. by estimating across which reference fields will the craft most likely fly). Now the correlation operation attempts to shift these dot clouds or marker clouds in relation to each other such that the sum total of corresponding distances of pairs of associated reference and real points is minimized.

This matching operations is, in accordance with the invention, obtained through a translatory shifting between reference and real scene by taking two points—a reference and a real point and superimposing them and then counting all pairs of reference and seen points which have a distance in relation to each other that is shorter than a predetermined threshold value. If only few pairs are found matching in that fashion, then one has not found the proper correlation, but if a sufficient number of pairs are found that way there is an increasing probability that in fact reference area and real seen area are found to agree. That position of agreement is ascertained which is of course a geometric translatory and may to some extent involve also a rotary shift value that was necessary in order to obtain the agreement and that is of course an update value showing how much the real position of the craft differs from the reference position. Through an iteration process and various attempts from various directions the accuracy of the method can indeed by increased.

It may also be advisable to treat and consider subclasses of objects separately. For example one will try to provide agreement between tree and tree groups and independently from that one will try to match housing patterns, streets or street patterns; the contour of a river, etc. The accuracy and problems in data acquisition differ for different types and classes of objects and now one can ascertain to what extent the various shifting of data from reference to real seen positions for different types do or do not agree, and that is an indication of the accuracy of the navigational method. A master program may control these efforts and provide separate supervision monitoring and evaluation.

It is of course desirable to render the method independent from speed errors which are errors attributed to the fact that the real speed above ground may be different from the separately measured speed. A directional error may also introduce uncertainty. Therefore it is generally desirable to have each territory processed in this fashion to be as short as possible, a 400 m strip length is a good figure of practical significance. The result of agreement will be weighted and added in a superimposed relation, so that the information about past correlations and attempts to provide correlation and matching is so to speak carried along a little while but as the craft progresses the weight of the past information and correlation result is reduced so that the influence of "the past" is gradually reduced the further the craft has receded from these objects.

Figure 10:
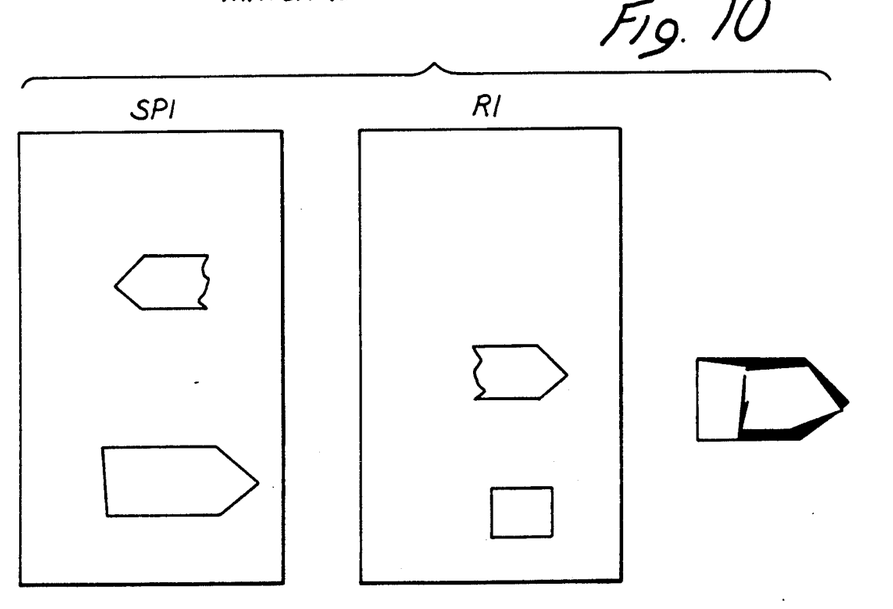

The second correlation method is called geometric shape analysis, or GFA, will now be described with reference to FIG. 10. It uses explicating shape and contour elements for characterizing objects. FIG. 10 therefore shows the left hand portion of the acquired content SPI of data put into store for a particular group of objects. In the middle there is a corresponding reference information and to the right is a depiction of superimposing reference images between two objects. In this method buildings e.g. are characterized through the contour of the elevation. one can also say that they are characterized by their boundary vectors. For this one determines first the boundary vectors under utilization of the segmentized range image of the building while employing the usual method of finding edges outlined now. The reference information RI was prepared in the same fashion there may have been certain preprocessing steps if the reference information is of a more general character.

The scene of the reference is attempted to be brought in agreement with the acquired scene through a translational shift so that the individual vectors are matched in an optimizing fashion. The criteria is here what can be called a differential area i.e. on delineating one image and superimposing it upon another image there is a certain area that delineates the mismatch. This is shown in a gray scale in the right hand part of FIG. 10. The search for possible agreement should be held to a minimum in terms of computing effort. For this one provides for a certain characterization of the individual vectors such as direction, disposition and length.

The agreement is now checked only by pairing vectors having similar features. The result is then used for calculating the requisite translation which in fact covers only similar reference and seen vectors as just defined. Following an identical shifting of all other vectors participating in the process they are checked whether or not for each vector in the scene there is or can be found a corresponding reference vector to be associated therewith.

Depending on the degree of agreement of the various vectors it will be possible that several positions of potential agreements can be found; this first approximating method is now augmented in that the various positions so found are tested as to further agreement features. For this the local context of the vectors is considered. It is tested e.g. to what extent neighboring vectors increase the probability of agreement of an individual vector itself with its assumed reference counterparts. This test is carried out through by calculating of reference areas corresponding to this procedure.

Having determined the differential areas for the various cases in accordance with the number of objects that go into the calculation in each instance, it is tested whether or not there is a sufficiently adequate agreement. For this it is not necessary that each and every object in the scene agrees exactly with its reference and vice versa. The agreement may be comparatively poor which is to be expected if the reference is somewhat outdated or if for one reason or another there has been a change in the scene by adding of buildings or tearing them down or by cutting down trees etc.

It is of course also possible to consider further features on an individual basis even though for the statistical basis these features have already been considered elsewhere but the individual 1:1 agreement may be indicative that not all particular features are of equal importance. Of course this presupposes that the particular feature can be found in both the scene of overflight and the reference area or at least is derivable therefrom.

The invention is not limited to the embodiments described above but all changes and modifications thereof, not constituting departures from the spirit and scope of the invention, are intended to be included.

We claim:

1. Apparatus for navigation and updating of navigation for aircraft under utilization of sensor image processing and a reference store comprising, a scanning sensor including a circuit for obtaining a two dimensional range image of a portion of overflight territory; the image being composed of image points each being represented by a brightness value corresponding to the distance of the craft from the respective territory point represented by the respective image point;

means connected to the sensor for segmentizing the image data in order to obtain an areal pattern of type features of and within and as part of the image for purposes of classifying particular types of objects across which the craft flies in terms of range/brightness information and relation between such information as between neighboring image points in transverse direction as well as in the direction of flight;

means connected to the means for segmentizing, for extracting particular signature defining features from the segmentizing means, including localized elevational jumps; and means connected to the means for extracting for determining the position of the craft by correlating a plurality of features and their spatial orientation to each other as extracted with corresponding stored reference information in order to provide a maximum fit that is indicative of deviation of the flight from a flight path as identified by the reference information.

2. Apparatus as in claim 1, including means connecting for evaluation of reflection images.

3. Apparatus as in claim 1, including additional processing means, for processing the image information towards compensating attitude and orientational errors of the craft vis-a-vis ground and in order to compensate further for the fanlike structure of the scanning as provided by the sensor.

4. Apparatus for navigation and updating of navigation for aircraft under utilization of sensor image processing and a reference store comprising:

a scanning sensor including a circuit for obtaining a range image of a portion of overflight territory, in a two dimensional raster pattern, wherein the brightness of image points differ from each other corresponding to differences in distance of territory points from the aircraft as represented by the respective image points;

means connected to the sensor, for detecting locally for groups of image points the following parameters, an average elevation for the group of image points, at least one gradient and a texture value in terms of elevational difference averages among neighboring points of the group;

means connected to the detecting means for combining adjacent image points on the basis of the data as provided by detecting means to determine areas of homogeneous as to elevation, gradient and texture;

means connected for extracting from these image groups particular features including localized elevational jumps, for purposes of classifying particular objects across which the craft flies on the basis of the texture, gradient and average value parameters; and means connected to the means for extracting, for determining the position of the craft by correlating a plurality of features and their spatial orientation to each other as extracted with corresponding stored reference information in order to provide a maximum fit that is indicative of deviation of the flight from a flight path as identified by the reference information.

5. Apparatus for navigation and updating of navigation for aircraft under utilization of sensor image processing and a reference store comprising;

a scanning sensor including a circuit to obtain a two dimensional, i.e. areal range image of a portion of overflight territory, the territory being the imaged object, wherein the image points differ in brightness corresponding to differences in distance of respective object points;

means connected to the sensor for segmentizing the image data within the areal image in order to obtain a particular raster pattern in terms of range differences defining brightness variations among neighboring image points taken in the direction of flight as well as transverse thereto;

means connected to the segmentizing means for extracting particular features including localized elevational jumps for purposes of classifying particular objects across which the craft flies; and means connected to the means for extracting, for determining the position of the craft by correlating a plurality of features and their spatial orientation to each other as extracted with corresponding stored reference information in order to provide a maximum fit that is indicative of deviation of the flight from a flight path as identified by the reference information.

6. Apparatus as in claim 5, including additional means for processing the image information for compensating orientational errors.

* * * * *